(12) United States Patent
Mustert

(10) Patent No.: US 6,181,913 B1
(45) Date of Patent: Jan. 30, 2001

(54) METHOD FOR ESTABLISHING A CONNECTION IN A SATELLITE SYSTEM AND SATELLITE SYSTEM SUITABLE FOR PRACTICING SUCH METHOD

(75) Inventor: Andreas Bernardus Mustert, Naarden (NL)

(73) Assignee: I.G.P. B.V., Naarden (NL)

( * ) Notice: Under 35 U.S.C. 154(b), the term of this patent shall be extended for 0 days.

(21) Appl. No.: 08/975,002

(22) Filed: Nov. 20, 1997

(30) Foreign Application Priority Data

Nov. 20, 1996 (NL) .................................................. 1004578

(51) Int. Cl.[7] .............................. H04B 7/185; H04Q 7/38

(52) U.S. Cl. ........................ 455/13.1; 455/12.1; 455/427; 455/428; 455/429; 455/430

(58) Field of Search .................................... 455/463, 464, 455/12.1, 13.1, 427, 430, 429, 428

(56) References Cited

U.S. PATENT DOCUMENTS

| 5,483,666 | * | 1/1996 | Yamada et al. | 455/62 |
| 5,526,404 | * | 6/1996 | Wiedeman et al. | 455/430 |
| 5,862,478 | * | 1/1999 | Cutler, Jr. et al. | 455/428 |
| 5,926,745 | * | 7/1999 | Threadgill et al. | 455/12.1 |
| 6,014,372 | * | 1/2000 | Kent et al. | 370/316 |

* cited by examiner

*Primary Examiner*—Daniel S. Hunter
*Assistant Examiner*—Alan Gantt
(74) *Attorney, Agent, or Firm*—Jacobson, Price, Holman & Stern, PLLC

(57) ABSTRACT

The invention relates to establishing a connection in a satellite system. The base station continuously transmits information to the satellite for establishing a connection. The first terminal receives the reference and control carrier wave retransmitted by the satellite, whereafter the received information is used for selecting at least one frequency available for communication, and the selected frequency will be used for a desired connection with a particular terminal.

34 Claims, 3 Drawing Sheets

METHOD FOR ESTABLISHING A CONNECTION IN A SATELLITE SYSTEM AND SATELLITE SYSTEM SUITABLE FOR PRACTICING SUCH METHOD

BACKGROUND OF THE INVENTION

FIELD OF THE INVENTION

This invention relates to a method for establishing a connection in a satellite system comprising at least one base station for transmitting and receiving electromagnetic signals, at least a first terminal for transmitting and receiving electromagnetic signals, at least a second terminal for receiving electromagnetic signals and at least one satellite with a transponder for receiving electromagnetic signals and for retransmitting the received signals, with the frequency of the retransmitted signals being shifted with respect to the received signals.

This invention further relates to a satellite system comprising at least one base station for transmitting and receiving electromagnetic signals, at least a first terminal for transmitting and receiving electromagnetic signals, at least a second terminal for receiving electromagnetic signals and at least one satellite with a transponder for receiving electromagnetic signals and for retransmitting the received signals, with the frequency of the retransmitted signals being shifted with respect to the received signals.

Such a satellite system is known per se. In these known satellite systems, such as the inmarsat satellite system, it is necessary to seek contact with the base station in order to file a request to establish a connection. For high-speed data links such as are used for digital video and digital audio connections, this requires special carrier waves operative in duplex mode via a separate narrow-band command channel. The first terminal desiring a connection with the second terminal should then first exchange information with the base station via the narrow-band channel, which information comprises, for instance, the identity of the first terminal and/or the identity of the second terminal as well as information relating to the connection to be established itself. When thus via the narrow-hand channel the necessary information has been exchanged with the base station, the first terminal can establish a wide-band connection. Such connection can then be made, for instance, with the second terminal. For the purpose of communication via the narrow-band channel and the wide-band connection, the first terminal will generally be provided with different transmitting and receiving systems. In particular, the second terminal is identical to the first terminal.

A disadvantage of such a system is that it is rather costly. This is caused by the fact that the terminals are provided with double transmission systems, whereby, as stated, the first transmission system is used for establishing a narrow-band connection with the base station, while the second transmission system is used for establishing a wide-band connection with another terminal or terminals. In the case of a satellite system these connections are established via the satellite. The object of the invention is to provide a method and a system that can be made of simpler, better and more efficient design.

SUMMARY OF THE INVENTION

To that end, the method according to the invention is characterized in that the base station comprises a database with available frequencies and/or frequencies being in use for communication between terminals, and for establishing a connection via the satellite between the first and second terminal the system carries out the following steps:

1) the base station continuously transmits information to the satellite for establishing a connection, the information being transmitted on a reference and control carrier wave for retransmission by the satellite, and the information comprising at least the available frequencies and/or frequencies being in use for communication between terminals;
2) the first terminal receives the reference and control carrier wave retransmitted by the satellite, whereafter the received information is used for selecting at least one frequency available for communication, which selected frequency will be used for a desired connection with a particular terminal;
3) the first terminal transmits an operating carrier wave on the selected frequency to the satellite for retransmission by the satellite; and
4) the base station receives the operating carrier wave coming from the first terminal, retransmitted by the satellite, determines on the basis thereof that the selected frequency is in use, adjusts accordingly the database with available frequencies and/or frequencies being in use for communication between terminals, and adjusts accordingly the information about the available frequencies and/or frequencies being in use for communication between terminals that is transmitted on the reference and control carrier wave.

Surprisingly, in accordance with the invention, it is possible in a satellite system for the operating carrier wave which is normally used for maintaining the desired connection itself, to be used also for building up the connection. Here it is not required, as is the case in the prior art, for a terminal, before proceeding to transmit on the operating carrier wave, to ask the base station via a separate, often narrow-band channel for permission to proceed to transmit on the operating carrier wave. The communication equipment can thus be greatly simplified and improved and be made of an economically more advantageous design. Moreover, in this manner a connection can be established faster.

Because the base station continuously transmits information for establishing a connection, the first terminal can receive this information at any moment when it is desired that with the aid of the first terminal a connection with, for instance, the second terminal is established. Here the first terminal only needs to be provided with a single transmission system. The transmission from the first terminal to the base station of information about the frequency which the first terminal wishes to proceed to use also occurs via the same channel. In particular, the fact is even that to that end an operating carrier wave is transmitted by the first terminal on the selected frequency itself. Upon reception of the operating carrier wave by the base station, it can be determined on the basis of the frequency of the operating carrier wave that a terminal wishes to establish a connection on that frequency. Once this has been established by the base station, the base station can immediately adjust the database and, accordingly, the information which is transmitted on the reference and control carrier wave mentioned.

According to an advanced embodiment of the method according to the invention, the system further traverses the following steps:

5) the first terminal transmits on the operating carrier wave the identity of at least the second terminal to the satellite;
6) the base station, after reception of the operating carrier wave retransmitted by the satellite, determines the identity of the second terminal;

7) the base station transmits via the reference and control carrier wave the identity of the second terminal as well as setting parameters for the second terminal to the satellite;

8) the second terminal receives the reference and control carrier wave retransmitted by the satellite, recognizes its own identity and proceeds to self-setting on the basis of the received setting parameters for receiving via the satellite the operating carrier wave, which can comprise audio/video or other information, transmitted by the first terminal.

Because presently also the identity of terminals is transmitted with which the first terminal wishes to establish a connection, the base station can set these terminals accordingly via the reference and control carrier wave. The setting parameters to be transmitted in this connection can relate, for instance, to the type of signal that will be transmitted, such as digital audio or digital video, to bit rate, to the selected frequency, and to other parameters through which in these terminals elements such as downconverters, modulators, demodulators and multiplexers can be set.

In particular, the base station, after establishing the identity of the second terminal in step (6), determines in a manner known per se a power with which the first terminal would have to transmit the operating carrier wave for communication via the satellite with the second terminal and the base station subsequently sets the power of the first terminal accordingly via the reference and control carrier wave.

According to a practical embodiment of the method, after step (8) a transmission by the first terminal is ended when the first terminal no longer receives the reference and control carrier wave, the base station instructs the first terminal via the reference and control carrier wave to end the transmission, or when a user ends the transmission.

According to a highly advanced embodiment of the method, the first and second terminal are each provided with an antenna and control means for directing the gain of the antenna, and at least the first or second terminal uses the reference and control carrier wave retransmitted by the satellite for directing the gain of the antenna to the satellite.

As a consequence, the first and second terminals can be designed as mobile terminals. These can be arranged at any place. Surprisingly, it is possible, with antennas and receiving and transmitting means known per se, to direct the gain of the antennas to the satellite on the basis of the reference and control carrier wave transmitted by the base station to the satellite and retransmitted by the satellite. Heretofore, to that end, satellites were provided with separate beacons. This in turn had as a consequence that the receiving systems of the terminals had to be provided with separate devices to be able to receive these beacons. According to the invention, this is not necessary. Accordingly, it has become possible, both for stationary terminals permanently directed to the satellite and for mobile terminals, to establish connections within the satellite system in a fully automatic manner.

In particular, the terminals mentioned are each provided with an identity code, and the database comprises the identity codes of the terminals, while further:

the first terminal in step (3) transmits its identity on the operating carrier wave;

the base station after step (3), upon reception of the identity of the first terminal transmitted by the first terminal on the operating carrier wave, transmits an acknowledgement to the first terminal via the reference and control carrier wave.

In this way a connection is established in a highly reliable manner, since the first terminal knows on the basis of the acknowledgement that it has made contact with the base station. Further, the base station can, on the basis of the identity code received, contribute to the costs of the use of the satellite system being charged.

In particular, the base station will transmit the acknowledgement prior to step (5). A user of the first terminal can then, upon reception of the acknowledgement and prior to step (5), input the identity of the second terminal at the first terminal for the purpose of carrying out step (5).

Preferably, the database comprises technical data of each of the terminals, the technical data relating, for instance, to possible transmitting and receiving frequencies and protocols for controlling components such as modulators, transmitters and receivers of the terminals in question.

In this manner, it is also possible to use different types of terminals, for instance, terminals that can transmit and/or receive only on a limited number of frequencies. The base station can then take this into account when a connection is to be established between different terminals. Also, the base station can thus optimally set the above-mentioned components of the terminals for the desired connection.

In particular, on the basis of the data stored in the database, the base station determines for each terminal which frequencies are available to the terminals in question. Preferably, the base station transmits in step (1) the available frequencies in relation to the identity of terminals on the reference and control carrier wave. On the basis of the received information about available frequencies for the first terminal, a user can then in step (2) input the desired frequency at the first terminal, while the first terminal can, for instance, display the received information about the available frequencies for the first terminal on a display. Also, via a predetermined protocol, the desired frequency can be automatically selected and inputted at the first terminal.

The information transmitted by the base station to the satellite in the first step can also comprise data about the identity of the satellite. This in turn provides the advantage that in particular mobile terminals wishing to establish a connection via a particular satellite, know promptly upon receiving the reference and control carrier wave that the proper satellite has been found.

In general, the frequency of the reference and control carrier wave for the satellite system will be predetermined. This frequency is therefore known at each of the terminals, so that it is ensured at all times that the connection mentioned can be established.

A satellite system according to the invention is characterized in that the base station comprises a database with available frequencies and/or frequencies being in use for communication between terminals, and for establishing a connection via the satellite between the first and second terminals the system carries out the following steps:

1) the base station continuously transmits information to the satellite for establishing a connection, this information being transmitted on a reference and control carrier wave for retransmission by the satellite, and this information comprising at least the available frequencies and/or frequencies being in use for communication between terminals;

2) the first terminal receives the reference and control carrier wave retransmitted by the satellite, whereafter the received information is used for selecting at least one frequency available for communication, which selected frequency will be used for a desired connection with a particular terminal;

3) the first terminal transmits an operating carrier wave on the selected frequency to the satellite for retransmission by the satellite; and 4) the base station receives the operating carrier wave coming from the first terminal, retransmitted by the satellite, determines on the basis thereof that the selected frequency is in use, adjusts accordingly the database with available frequencies and/or frequencies being in use for communication between terminals, and adjusts accordingly the information about available frequencies and/or frequencies being in use for communication between terminals transmitted on the reference and control carrier wave.

In particular, the connection that is established is a simplex connection, with the first terminal transmitting information to the second terminal.

The invention will presently be elucidated in more detail with reference to the drawings, in which:

DESCRIPTION OF THE INVENTION

Figure 1:
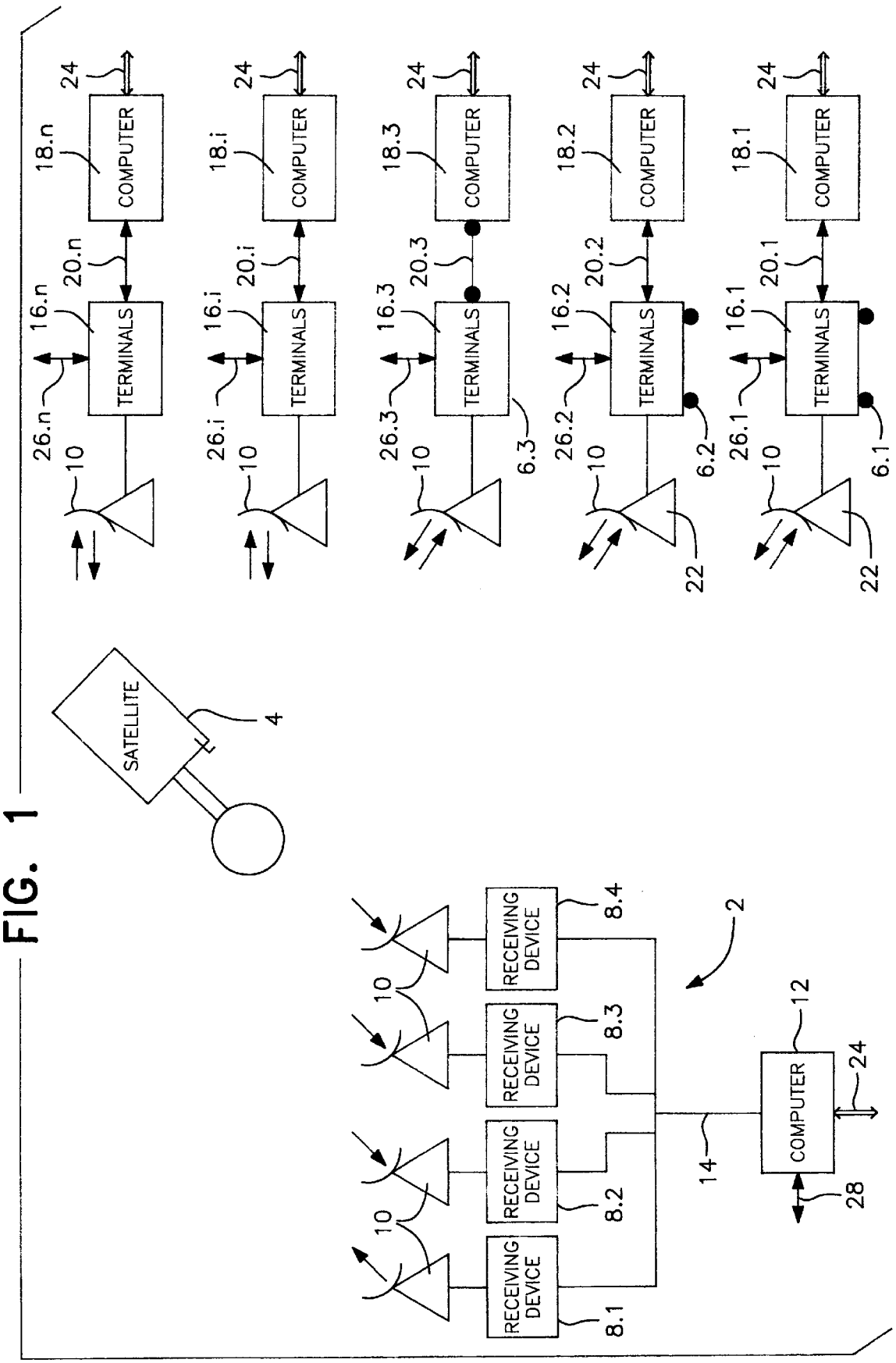
FIG. 1 shows a possible embodiment of a satellite system according to the invention.

In FIG. 1 reference numeral 1 designates a satellite system according to the invention. The system in this example is made up of a base station 2, a satellite 4 and a number of terminals 6.i (i=1,2,3, ... n). In this example, n=4, but in practice n can be a much greater number in the order of hundreds or thousands.

The base station 2 in this example is made up of four identical transmitting and receiving devices 8.i (i=1,2,3 or 4). As will be further explained hereinafter, the first receiving device 8.1 is generally used to transmit, while the second, third and fourth receiving devices 8.2–8.4 are generally used for receiving signals. For reasons of economy, however, the transmitting and receiving devices 8.i have been chosen to be equal to each other. For the purpose of, respectively, transmitting and receiving signals, each of the transmitting and receiving devices is provided with an associated antenna 10. Further, the base station 2 comprises a computer 12 which is connected via a bus 14 to the respective transmitting and receiving devices 8.i. As will be explained hereinafter, via the bus 14 the transmitting and receiving devices are supplied with signals which set the transmitting and receiving devices in question and which are transmitted via the transmitting and receiving devices in question. Further, signals which are received through the transmitting and receiving devices 8.2–8.4 are fed to the computer 12 via the bus 14.

The terminals 6.i are each provided with a transmitting and receiving device 16.i (i=1,2,3, ... n). The transmitting and receiving devices 16.i in this example are identical to the transmitting and receiving devices 8.i. Furthermore, each terminal 6.i is further provided with a computer 18.i (i=1,2,3 ... n). The computer 18.i is connected via a line 20.i (i=1,2,3, ... n) to the transmitting and receiving device 16.i. Via the line 20.i the computer 18.i can inter alia set the transmitting and receiving device 16.i for a desired operating frequency. Via the line 20.i the computer 18.i can furthermore feed to the transmitting and receiving device signals which are to be transmitted by the transmitting and receiving device 16.i. To that end, each terminal 6.i further comprises an antenna 10. In this example, the base station 2 is arranged stationarily. The satellite 4 is geostationary. To that end, the antennas 10 of the base station are each fixedly arranged and accurately directed to the satellite 4. The terminal 6.3 is also fixedly arranged in this example. Accordingly, the antenna 10 of the terminal 6.3 has once been accurately aligned with the satellite 4. The terminals 6.1. and 6.2, by contrast, are of mobile design. In this example, the first and second terminals 6.1. and 6.2 are therefore each provided with control means 22, known per se, for directing the gain of the antenna 10. The control means in question are shown diagrammatically in FIG. 1. Each of the computers 18.i is provided with a keyboard and a display 24. The keyboard and the display 24 are represented diagrammatically by an arrow in FIG. 1. This is to indicate that a user can input information at the computer or can read information at the computer. Further, each transmitting and receiving device 16.i is provided with a terminal port 26.i. The terminal port 26.i can be used for supplying signals to be transmitted, such as digital audio en video signals. Further, the terminal port 26.i can be used for the output of received signals.

Similarly, the computer 12 is provided with a schematically represented display and keyboard 24. In addition, the computer 12 is provided with an output port 28 for feeding data signals to the computer 12 or for outputting data signals from the computer 12.

Figure 2:
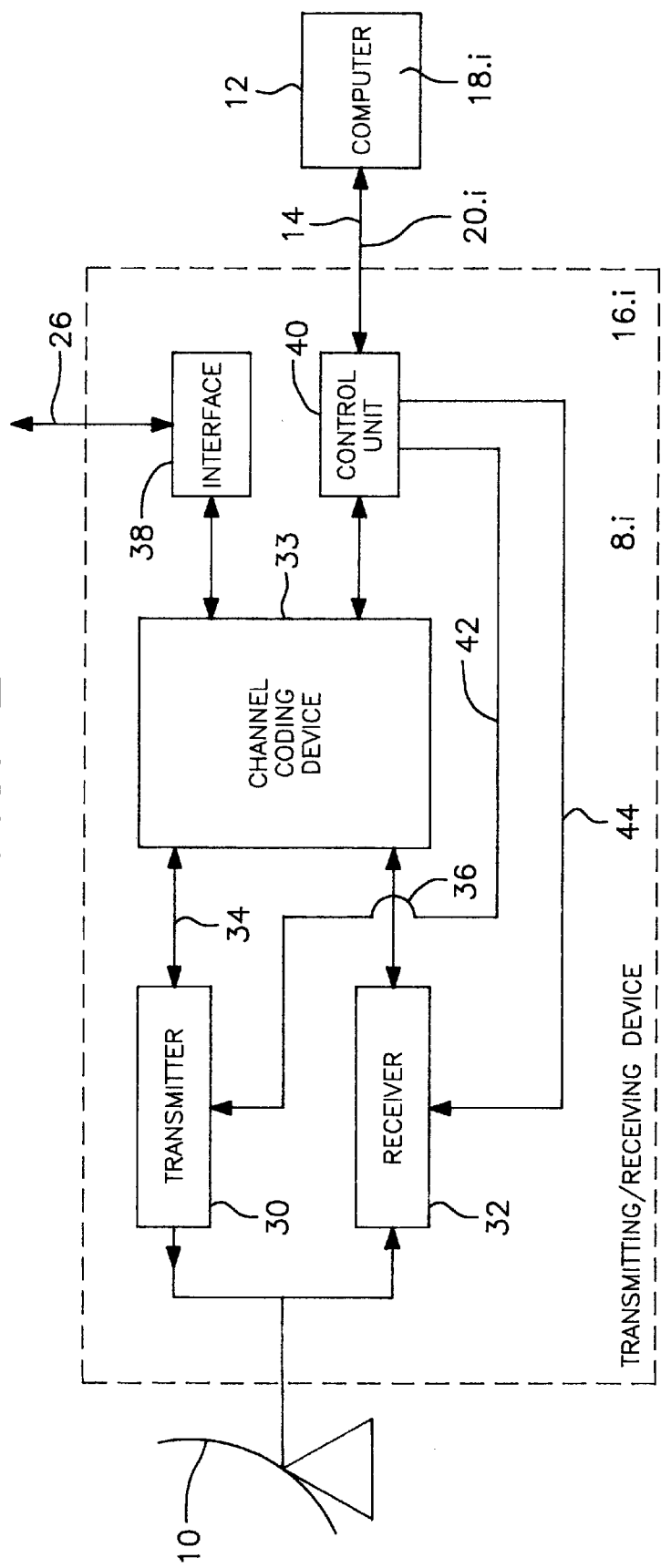
FIG. 2 is a possible embodiment of a terminal of the satellite system according to FIG. 1.

As stated, in this example the transmitting and receiving devices 8.i, 16.i are of identical design. A possible embodiment of such a transmitting and receiving device is shown in FIG. 2. The transmitting and receiving device comprises a transmitter 30 and a receiver 32. The device further comprises a channel coding device 33, which encodes signals to be transmitted by the transmitter 30 or decodes signals received by the receiver 32. To that end, the coder 33 is connected with the transmitter 30 and receiver 32 via lines 34 and 36, respectively. The device further comprises an interface 38 which is connected between the terminal port 26 and the coder 33. The device further comprises a control unit 40 connected between bus 14 or line 20.i. Via the control unit 40 data can be supplied from the computer 12, 18.i to the coder 33 for transmission. Furthermore, via the control unit 40 received signals can be supplied to the computer 12, 18.i. Further, the control unit 40 is connected via lines 42 and 44 with the transmitter 30 and the receiver 32, respectively. Via these lines the control unit 40 can set the transmitting frequency of the transmitter and the receiving frequency of the receiver 32.

The system according to FIG. 1 concerns a transmission system whereby the terminals 6.i can communicate with each other via the satellite 4. For instance, the terminal 6.2 transmits a transmitted signal to the satellite 4. The satellite 4 comprises a transponder which retransmits each signal. The retransmitted signal is shifted in frequency with respect to the received signal. The retransmitted signal can be received, for instance, by terminal 6.3. Now, for transmitting and receiving signals via the satellite 4 a large number of frequencies spread over a wide frequency range are available to the terminals 6.i. This range need not be a continuous range, but may include 'gaps', which 'gaps' represent frequencies that are not available. This wide-band range is shown schematically in FIG. 3. Establishing a connection between various terminals via the satellite is then to be realized on an available frequency of the frequency range. Moreover, for the use of a frequency, often a compensation is to be paid. In order to effect a connection it is therefore necessary that a free frequency be designated for the desired connection. To that end, the system comprises the base station mentioned. Accordingly, in this example, each of the terminals is suitable for transmitting and receiving electromagnetic signals within the wide-band range mentioned. It is possible that some terminals are suitable only for transmitting and/or receiving signals on a limited number of frequencies. The satellite is provided with a transponder for receiving electromagnetic signals and one for retransmitting the received signals, with the frequency of retransmitted signals being shifted with respect to the received signals.

Figure 3:
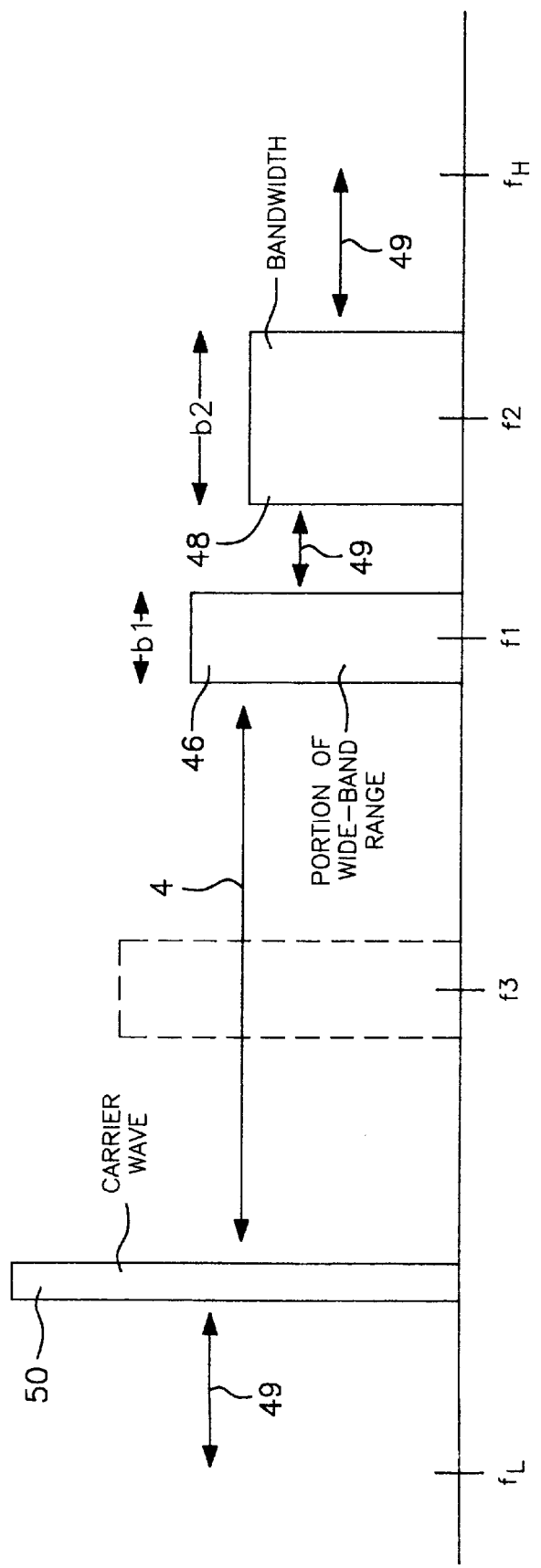
FIG. 3 is a visualization of at least a part of the data stored in a database of the satellite system according to FIG. 1.

The base station is provided with a database contained in the computer 12. This database comprises available frequencies and/or frequencies being in use for communication between terminals. In the example of FIG. 3 a part of this database is shown, wherein $f_L$ is the lowest frequency of the wide-band range and $f_H$ is the highest frequency of the wide-band range. In FIG. 3 it is shown that a portion 46 of the wide-band range is already in use for communication between, in this example, terminals 6.6 and 6.7. The portion has a (medium) frequency $f_1$ and a bandwidth $b_1$. Both terminals work in duplex mode, i.e. both terminals transmit data to each other and receive data from each other. Further, it appears from FIG. 3 that the frequency $f_2$ with the associated bandwidth $b_2$ (block 48) is used by terminals 6.9, 6.10 and 6.11, that is, terminal 6.9 transmits information which is received by the terminals 6.10 and 6.11. The terminals 6.10 and 6.11 accordingly serve only as receivers, while the terminal 6.9 works only as a transmitter. Further, in FIG. 3 the arrows 49 indicate the still free frequencies available for communication between terminals. The base station 2 continuously transmits information to the satellite via the transmitting and receiving device 8.1, for establishing a connection. This information is transmitted on a reference and control carrier wave whose frequency and associated bandwidth are predetermined. The carrier wave mentioned is indicated in FIG. 3 at 50 and, of course, is also stored in the database. The reference and control carrier wave is transmitted to the satellite for retransmission by the satellite. The information mentioned comprises at least the available frequencies and/or frequencies being in use, together with the associated bandwidths. This information is fed from the computer 12 via the bus 14 to the transmitting and receiving device 8.1.

In this example the database can moreover comprise technical data of each of terminals 6.i, the technical data relating to, for instance, the possible transmitting and receiving frequencies which can be used by the terminals in question. Furthermore, the technical data can comprise protocols for the control of components such as modulators, transmitters and receivers of the terminals in question. On the basis of the data stored in the database, the base station can then determine for each terminal which frequencies are available to the terminal in question. In that case, each of the terminals is provided with its own identity code, which is likewise stored in the database. According to this particular embodiment, the base station then transmits not only data for the available frequencies and/or frequencies being in use, but further transmits data about the available frequencies in relation to the identity of the terminals on the reference and control carrier wave. The thus transmitted reference and control carrier wave is retransmitted by the transponder of the satellite for reception by each of the terminals.

Each of the terminals receives the reference and control carrier wave retransmitted by the satellite. As stated, each of the terminals is provided with a display for displaying received information about the available frequencies. Hereinafter it is supposed that the first terminal wishes to transmit video information to the second terminal. Accordingly, for the benefit of a user, on the display of the computer of the first terminal the frequencies available to this terminal and optionally associated bandwidths are displayed. With the available frequencies on display at hand, a user can input the desired frequency by way of the inputting means (keyboard) of the computer 18.i at the first terminal 6.1. Using a predetermined protocol, the computer 18.i can also select the desired frequency automatically, without intervention of a user. The computer 18.i of the first terminal transmits command signals via line 20.i to the control unit 40 of the first terminal. On the basis of the command signals, via line 42, the control unit 40 in turn sets the transmitter 30 of the first terminal for the selected transmitting frequency. Then the first terminal 6.1 transmits an operating carrier wave on the selected frequency $f_3$ to the satellite for retransmission by the satellite. This operating carrier wave further comprises the identity code of the first terminal.

The transmission of the operating carrier wave with frequency $f_3$ by the first terminal is presently entirely in conformity with the manner in which it will eventually be transmitted to the second terminal, with the exception of the power level. The power level is reduced in such a manner that it can be just received by the base station.

The base station comprises a number of transmitting and receiving devices 8.2, 8.3 and 8.4 which in combination scan the frequencies still available. Here it is not necessary that each transmitting and receiving device queries only one frequency. In general, each transmitting and receiving device will scan a number of frequencies. The more transmitting and receiving devices are used, the faster the scanning of the available frequencies can be carried out.

However that may be, the base station receives the operating carrier wave of the first terminal retransmitted by the satellite. On the basis thereof, it is established that the frequency $f_3$ is presently in use. The base station therefore adjusts accordingly the database with the available frequency and/or frequencies being in use for communication between terminals. (Shown in dots in FIG. 3). Simultaneously, the base station adjusts accordingly the information which is transmitted on the reference and control carrier wave about the available frequencies and/or frequencies being in use for communication between terminals. Then, upon receiving the identity of the first terminal transmitted by the first terminal on the operating carrier wave, the base station transmits an acknowledgement to the first terminal via the reference and control carrier wave.

After the first terminal has received the acknowledgement from the base station via the reference and control carrier wave, a user can input via the computer 18.1 of the first terminal 6.1 the identity of the eventual destination, in this case the identity code of the second terminal. The first terminal will then transmit this identity on the operating carrier wave to the satellite. Upon receiving the operating carrier wave of frequency $f_3$ retransmitted by the satellite, the base station determines the identity of the second terminal. Now that the base station knows the identity of the second terminal, it can determine in a manner known per se with what power the first terminal is to proceed to transmit. This depends on the technical configuration of the second terminal and, if known, on the geographical position of the first and second terminal. Thus, via the reference and control carrier wave the base station will set the transmitting power of the first terminal. This can proceed in a manner known per se, in that the reference and control carrier wave is received by the receiver 32 of the first terminal 6.1. The thus received signals are supplied via the coder 33 of the first terminal to the control unit 40 of the first terminal. The control unit 40 transmits the thus obtained information to the computer

18.1, which recognizes this information as being a command signal for setting the power and transmits a corresponding command signal to the control unit 40. Via line 42 the control unit 40 can then set accordingly the transmitting power of the transmitter 30 of the first terminal.

By way of the reference and control carrier wave the base station transmits to the satellite the identity of the second terminal as well as setting parameters for the second terminal. These setting parameters comprise inter alia the receiving frequency for receiving the signals coming from the first terminal, retransmitted by the satellite. This receiving frequency will therefore be equal to the frequency $f_3$ and the standard frequency shift which is caused by the transponder of the satellite. Also other setting parameters can be co-transmitted, for the purpose of setting downconverters, modulators, coders, multiplexers, and receivers of the second terminal, all depending on the configuration of the second terminal in question.

The second terminal, which receives the reference and control carrier wave retransmitted by the satellite, recognizes its own identity and proceeds to self-setting on the basis of the setting parameters associated with this identity for the purpose of receiving via the satellite the operating carrier wave transmitted by the first terminal. This operating carrier wave can comprise, for instance, audio/video or other information. In this example, via terminal port 26.1 video information is supplied to terminal 6.1. Accordingly, the terminal 6.2 delivers received video information via terminal port 26.2.

Thus a connection has been established between the first and second terminals. This example involves a simplex connection whereby the first terminal transmits information to the second terminal. A transmission by the first terminal can be ended when the first terminal, for instance, no longer receives the reference and control carrier wave. It is also possible that the base station instructs the first terminal via the reference and control carrier wave to end the transmission. In addition, it is possible that the user of the first terminal ends the transmission of the first terminal via the computer 18.1. Upon termination of the transmission, the base station can, for instance, generate a bill for the services rendered, that is, for the use of a part of the wide-band range available for communication. To that end, the computer 12 can send information via output port 28 to, for instance, an office elsewhere.

In particular, the information the base station transmits continuously to the satellite further includes data about the identity of the satellite. This provides as an advantage that it can be determined at a terminal whether the antenna 10 is directed at the proper satellite. In particular when the terminals are mobile terminals, as in this case the terminals 6.1 and 6.2, this is of particular importance. In this example, the first and second terminals are each provided with an antenna 10 and control means 22 for directing the gain of the antenna. It has been found to be possible for the antennas 10 of the first and second terminals to be accurately directed at the satellite on the basis of the reception of the reference and control carrier wave retransmitted by the satellite. Surprisingly, it is found to be possible also on the basis of the received reference and control carrier wave to set the polarization direction of the antenna 10.

In particular, the mobile terminals 16.1 and 16.2 further comprise an electronic compass and a GPS receiver. Thus, for instance, the GPS receiver of the first terminal can accurately determine the position of the first terminal. Further, using the compass, the direction of the terminal can be determined. On the basis of the position and the azimuthal direction of the terminal, the computer 18.1 can calculate in a manner known per se in what sky segment the satellite 4 should be located. The computer 18.1 can thus actuate the control means 22 in order for the gain of the antenna to be at least substantially directed to the satellite. Then, in a manner known per se, using control means 22, a scan along the sky segment in question can be performed, until the satellite has been found. Surprisingly, the reference and control carrier wave retransmitted by the transponder can be received sufficiently accurately to direct the gain of the antenna. In the known systems, the satellites often comprise separate beacons which transmit signals in separate narrow-band channels for directing the antennas. According to the invention it is therefore presently possible to establish a connection between terminals, including alignment of the antennas, in a fully automatic manner.

In this example the system only comprises a single base station. However, the invention is in no way limited thereto. Many base stations can be connected with each other in a network, where these base stations can refer terminals to other satellites when a certain satellite is fully engaged. Such referral then typically entails re-alignment of the antennas 10. What is so special now, is that this too can be carried out entirely automatically, as described hereinbefore. By transmitting to a terminal, via the reference and control carrier wave, the position where the new satellite to be used is located, as well as its identity, this terminal, as described hereinbefore, can direct the gain of its antenna to the sky segment in question on the basis of GPS coordinates and on the basis of coordinates obtained by the electronic compass. Thereafter, again as described hereinbefore, a scan can be performed until the reference and control carrier wave is found which is transmitted by the other or the same base station via at least the other satellite. In this example, $f_L$ and $f_H$ are defined. This, however, is not a requisite, since the range in which the available frequencies are located can vary too. Therefore it is sufficient merely to monitor available frequencies and frequencies being in use for communication. If $f_L$ and $f_H$ are defined, and moreover the entire frequency spectrum of $f_L$ and $f_H$ is usable for communication, in principle only the available frequencies or frequencies being in use need to be monitored, since these are directly related to each other. Such variants are all understood to fall within the scope of the invention.

What is claimed is:

1. A method for establishing a connection in a satellite system comprising at least one base station for transmitting and receiving electromagnetic signals, at least a first terminal for transmitting and receiving electromagnetic signals, at least a second terminal for receiving electromagnetic signals and at least one satellite with at least one transponder for receiving electromagnetic signals and for retransmitting the received signals, with the frequency of the retransmitted signals being shifted with respect to the received signals, wherein said method comprising the steps of:

providing a base station having a database with frequencies including available frequencies and engaged frequencies for communication between said terminals, establishing a connection via the satellite between the first and second terminal;

transmitting continuously information from said base station to the satellite for establishing a connection, said information being transmitted on a reference and control carrier wave for retransmission by the satellite, and said information including at least the available frequencies for communication between terminals;

receiving the reference and control carrier wave retransmitted by the satellite at the first terminal, whereafter using the received information for selecting at least one frequency available for communication, which selected frequency will be used for a desired connection with a particular terminal;

transmitting by said first terminal an operating carrier wave on the selected frequency to the satellite for retransmission by the satellite; and receiving the operating carrier wave coming from the first terminal by the base station, retransmitted by the satellite, determining on the basis thereof that the selected frequency is in use, adjusting accordingly the database with available frequencies for communication between terminals, and adjusting accordingly the information about the available frequencies for communication between terminals that is transmitted on the reference and control carrier wave.

2. The method according to claim 1, wherein the method further traverses the following steps:

transmitting by said first terminal on the operating carrier wave the identity of at least the second terminal to the satellite;

establishing the identity of the second terminal by the base station, upon receiving the operating carrier wave retransmitted by the satellite;

transmitting via the reference and control carrier wave by the base station the identity of the second terminal as well as setting parameters for the second terminal to the satellite;

receiving by the second terminal the reference and control carrier wave retransmitted by the satellite, recognizing its own identity and proceeding to self-setting on the basis of the received setting parameters for receiving via the satellite the operating carrier wave, which can comprise audio/video or other information, transmitted by the first terminal.

3. The method according to claim 2, further comprising the steps of:

determining by the base station, after establishing the identity of the second terminal, a power with which the first terminal would have to transmit the operating carrier wave for communication via the satellite with the second terminal, and setting subsequently the power of the first terminal accordingly via the reference and control carrier wave.

4. The method according to claim 2, further comprising the steps of:

ending a transmission by the first terminal when the first terminal no longer receives the reference and control carrier wave, instructing by the base station the first terminal via the reference and control carrier wave to end the transmission, or when a user ends the transmission.

5. A method for establishing a connection in a satellite system comprising at least one base station for transmitting and receiving electromagnetic signals, at least a first terminal for transmitting and receiving electromagnetic signals, at least a second terminal for receiving electromagnetic signals and at least one satellite with at least one transponder for receiving electromagnetic signals and for retransmitting the received signals, with the frequency of the retransmitted signals being shifted with respect to the received signals, wherein said method comprising the steps of:

providing a base station having a database with available frequencies including available frequencies and engaged frequencies for communication between said terminals, establishing a connection via the satellite between the first and second terminal;

transmitting continuously information from said base station to the satellite for establishing a connection, said information being transmitted on a reference and control carrier wave for retransmission by the satellite for establishing a connection, said information being transmitted on a reference and control carrier wave for retransmission by the satellite, and said information including at least the frequencies including available frequencies and engaged frequencies for communication between terminals;

receiving the reference and control carrier wave retransmitted by the satellite at the first terminal, whereafter using the received information for selecting at least one frequency available for communication, which selected frequency will be used for a desired connection with a particular terminal;

transmitting by said first terminal an operating carrier wave on the selected frequency to the satellite for retransmission by the satellite; and receiving the operating carrier wave coming from the first terminal by the base station, retransmitted by the satellite, determining on the basis thereof that the selected frequency is in use, adjusting accordingly the database with the frequencies for communication between terminals, adjusting accordingly the information about the frequencies for communication between terminals that is transmitted on the reference and control carrier wave, providing the first and second terminal with an antenna and control means for directing the gain of the antenna, and using by at least the first or second terminal the reference and control carrier wave retransmitted by the satellite for directing the gain of the antenna to the satellite.

6. The method according to claim 1, further comprising the steps of:

providing each said terminals with an identity code, and the database comprises the identity codes of the terminals, while further:

transmitting the identity of the first terminal on the operating carrier wave;

transmitting an acknowledgement from the base station, upon receiving the identity of the first terminal on the operating carrier wave, to the first terminal via the reference and control carrier wave.

7. The method according to claim 2, further comprising the steps of:

transmitting from the base station the acknowledgement transmitting the identity of at least the second terminal.

8. The method according to claim 7, further comprising the steps of:

inputting by a user of the first terminal, upon reception of the acknowledgement and prior to transmitting the identity of at least the second terminal, the identity of the second terminal at the first terminal for the purpose of carrying out the step of transmitting.

9. The method according to claim 6, comprising the steps of:

providing the database with technical data of each of the terminals, the technical data relating to possible transmitting and receiving frequencies and protocols for controlling components such as modulators, transmitters and receivers of the terminals in question.

10. The method according to claim 9, comprising the steps of:
   determining by the base station, on the basis of the data stored in the database, for each terminal which frequencies are available to the terminals in question.

11. The method according to claim 10, comprising the steps of:
   transmitting by the base station the available frequencies in relation to the identity of terminals on the reference and control carrier wave.

12. The method according to claim 11, comprising the steps of:
   inputting a user, on the basis of the received information about available frequencies for the first terminal, the desired frequency at the first terminal or that the first terminal inputs the desired frequency automatically.

13. The method according to claim 11, comprising the steps of:
   displaying by the first terminal at least the received information about the available frequencies for the first terminal on a display.

14. The method according to claim 5, comprising the steps of:
   including the information transmitted by the base station to the satellite in the first step data about the identity of the satellite.

15. The method according to claim 5, comprising the steps of:
   predetermining the frequency of the reference and control carrier wave.

16. The method according to claim 5, comprising the steps of:
   determining beforehand a lowest and highest frequency for the possible frequencies available for communication.

17. The method according to claim 16, comprising the steps of:
   providing a simplex connection for said connection, with the first terminal transmitting information to the second terminal.

18. A satellite system comprising at least one base station for transmitting and receiving electromagnetic signals, at least a first terminal for transmitting and receiving electromagnetic signals, at least a second terminal for receiving electromagnetic signals and at least one satellite with at least one transponder for receiving electromagnetic signals and for retransmitting the received signals, with the frequency of the retransmitted signals being shifted with respect to the received signals, characterized in that the base station comprises a database with frequencies for communication between terminals, and for establishing a connection via the satellite between the first and second terminal the system carries out the following steps:
   1) the base station continuously transmits information to the satellite for establishing a connection, said information being transmitted on a reference and control carrier wave for retransmission by the satellite, and said information comprising at least the available frequencies and/or frequencies being in use for communication between terminals;
   2) the first terminal receives the reference and control carrier wave retransmitted by the satellite, whereafter the received information is used for selecting at least one frequency available for communication, which selected frequency will be used for a desired connection with a particular terminal;
   3) the first terminal transmits an operating carrier wave on the selected frequency to the satellite for retransmission by the satellite; and
   4) the base station receives the operating carrier wave coming from the first terminal, retransmitted by the satellite, determines on the basis thereof that the selected frequency is in use, adjusts accordingly the database with available frequencies and/or frequencies being in use for communication between terminals, and adjusts accordingly the information about the available frequencies and/or frequencies being in use for communication between terminals that is transmitted on the reference and control carrier wave.

19. A satellite system according to claim 18, characterized in that the system further traverses the following steps:
   5) the first terminal transmits on the operating carrier wave the identity of the second terminal to the satellite;
   6) the base station, upon receiving the operating carrier wave retransmitted by the satellite, establishes the identity of the second terminal;
   7) the base station transmits via the reference and control carrier wave the identity of the second terminal as well as setting parameters for the second terminal to the satellite;
   8) the second terminal receives the reference and control carrier wave retransmitted by the satellite, recognizes its own identity and proceeds to self-setting on the basis of the received setting parameters for receiving via the satellite the operating carrier wave, which can comprise audio/video or other information, transmitted by the first terminal.

20. A satellite system according to claim 19, characterized in that the base station, after establishing the identity of the second terminal in step (6), determines in a manner known per se a power with which the first terminal would have to transmit the operating carrier wave for communication via the satellite with the second terminal and that the base station subsequently sets the power of the first terminal accordingly via the reference and control carrier wave.

21. A satellite system according to claim 19, characterized in that after step (8) a transmission by the first terminal is ended when the first terminal no longer receives the reference and control carrier wave, the base station instructs the first terminal via the reference and control carrier wave to end the transmission, or when a user ends the transmission of the first terminal.

22. A satellite system comprising:
   at least one base station for transmitting and receiving electromagnetic signals;
   at least a first terminal for transmitting and receiving electromagnetic signals;
   at least a second terminal for receiving electromagnetic signals;
   at least one satellite with at least one transponder for receiving electromagnetic signals and for retransmitting the received signals, with the frequency of the retransmitted signals being shifted with respect to the received signals,
   the base station including a database with frequencies including available frequencies and engaged frequencies for communication between terminals, and for establishing a connection via the satellite between the first and second terminal the system carries out the following steps:
   1) the base station continuously transmits information to the satellite for establishing a connection, said information being transmitted on a reference and control carrier wave for retransmission by the satellite, and said information comprising at least the frequencies for communication between terminals;

2) the first terminal receives the reference and control carrier wave retransmitted by the satellite, whereafter the received information is used for selecting at least one frequency available for communication, which selected frequency will be used for a desired connection with a particular terminal;

3) the first terminal transmits an operating carrier wave on the selected frequency to the satellite for retransmission by the satellite;

4) the base station receives the operating carrier wave coming from the first terminal, retransmitted by the satellite, determines on the basis thereof that the selected frequency is in use, adjusts accordingly the database with frequencies for communication between the terminals, and adjusts accordingly the information about the frequencies for communication between the terminals that is transmitted on the reference and control carrier wave; and the first and second terminal are each provided with an antenna and control means for directing the gain of the antenna, and at least the first or second terminal comprises means for using the reference and control carrier wave retransmitted by the satellite for directing the gain of the antenna to the satellite.

23. A satellite system according to claim 18, characterized in that said terminals are each provided with an identity code, and the database comprises the identity codes of the terminals, while further:

the first terminal in step (3) transmits its identity on the operating carrier wave;

the base station after step (3), upon receiving the identity of the first terminal transmitted by the first terminal on the operating carrier wave, transmits an acknowledgement to the first terminal via the reference and control carrier wave.

24. A satellite system according to claim 19, characterized in that the base station transmits the acknowledgement to the first terminal prior to step (5).

25. A satellite system according to claim 24, characterized in that the first terminal comprises inputting means for inputting the identity of the second terminal at the first terminal for the purpose of carrying out step (5).

26. A satellite system according to claim 23, characterized in that the database comprises technical data of each of the terminals, the technical data relating, for instance, to possible transmitting and receiving frequencies and protocols for controlling components such as modulators, transmitters and receivers of the terminals in question.

27. A satellite system according to claim 26, characterized in that the base station comprises a computer which, on the basis of the data stored in the database, determines for each terminal which frequencies are available to the terminals in question.

28. A satellite system according to claim 27, characterized in that the base station transmits in step (1) the available frequencies in relation to the identity of terminals on the reference and control carrier wave.

29. A satellite system according to claim 27, characterized in that the first terminal comprises a display for displaying the received information about the available frequencies for the first terminal, the first terminal further comprising inputting means for inputting the desired frequency on the basis of the available frequencies displayed.

30. A satellite system according to claim 27, characterized in that the first terminal comprises means for selecting the desired frequency via a predetermined protocol.

31. A satellite system according to claim 22, characterized in that the information which the base station transmits in the first step to the satellite further comprises data about the identity of the satellite.

32. A satellite system according to claim 22, characterized in that the frequency of the reference and control carrier wave is predetermined.

33. A satellite system according to claim 22, characterized in that beforehand a lowest and highest frequency have been determined for the possible frequencies available for communication.

34. A satellite system according to claim 22, characterized in that said connection is a simplex connection, with the first terminal transmitting information to the second terminal.

* * * * *